United States Patent
Baecke et al.

(10) Patent No.: US 6,597,365 B1
(45) Date of Patent: Jul. 22, 2003

(54) INDICATING DEVICE WITH AND WITHOUT ANTIALIASING

(75) Inventors: Thomas Baecke, Waldbronn (DE); Peter Hartmann, Karlsruhe (DE)

(73) Assignee: Valeo Borg Instruments GmbH & Co. KG (DE)

( * ) Notice: Subject to any disclaimer, the term of this patent is extended or adjusted under 35 U.S.C. 154(b) by 0 days.

(21) Appl. No.: 09/151,333

(22) Filed: Sep. 11, 1998

(30) Foreign Application Priority Data

Sep. 11, 1997 (DE) .......................... 197 40 033

(51) Int. Cl.[7] .......................... G09G 5/02; G01C 21/30; G08G 1/123; G06K 9/40
(52) U.S. Cl. .................. 345/611; 701/208; 340/990; 340/995; 382/269
(58) Field of Search .................. 345/136, 629, 345/635; 340/990, 995; 342/452; 707/100, 102; 701/213, 208, 200; 382/269

(56) References Cited

U.S. PATENT DOCUMENTS

| | | | |
|---|---|---|---|
| 4,041,443 A | * 8/1977 | Thigpen | 367/45 |
| 4,825,381 A | * 4/1989 | Bottorf et al. | 345/468 |
| 4,939,661 A | * 7/1990 | Barker et al. | 701/200 |
| 5,638,463 A | 6/1997 | Ohshita | 382/195 |
| 5,757,375 A | * 5/1998 | Kawase | 345/136 |
| 5,940,080 A | * 8/1999 | Ruehle et al. | 345/432 |
| 6,118,886 A | * 9/2000 | Baumgart et al. | 382/103 |
| 6,128,000 A | * 10/2000 | Jouppi et al. | 345/136 |

FOREIGN PATENT DOCUMENTS

| | | |
|---|---|---|
| DE | 32 40 233 | 5/1983 |
| DE | 34 19 693 | 11/1984 |
| DE | 43 03 262 | 8/1994 |
| DE | 44 21 261 | 12/1994 |
| EP | 0 488 534 | 6/1992 |
| EP | 0 619 556 | 10/1994 |
| GB | 2 282 514 | 4/1995 |

OTHER PUBLICATIONS

Don P. Mitchell, Generating Antialiased Images At Low Sampling Densities, SIGGRAPH '87 Conf Proc, Anaheim, Ca, USA, Jul. 27–31, 1987 p 65–72.*
Foley et al, Computer Graphics: Principles and Practice Second Edition in C, Jul. 199.*
European Patent Office Search Report dated Oct. 29, 1999.
"Two–Pass Antialiasing In Constructive Solid Geometry Rendering", IBM Technical Disclosure Bulletin, vol. 32, No. 88, Jan. 1990, S.278,279.
German Search Report dated Aug. 8, 1998.

* cited by examiner

Primary Examiner—Matthew C. Bella
Assistant Examiner—A Blackman
(74) Attorney, Agent, or Firm—Morgan & Finnegan, LLP (57) ABSTRACT

The invention concerns an indicating device for the optical reproduction of graphics, with a data-processing installation for the graphic processing of the information to be represented, and an indicating unit for the visualization of the processed information, wherein[, among others,] the data-processing installation uses antialiasing procedures in the graphical processing. In generating an image, the data-processing installation uses, for the graphical processing of at least two image areas or image objects, different anti-aliasing procedures, or else represents one of these image areas or one of these image objects without an antialiasing procedure.

18 Claims, 5 Drawing Sheets

INDICATING DEVICE WITH AND WITHOUT ANTIALIASING

BACKGROUND OF THE INVENTION

The invention concerns an indicating device for the optical reproduction of graphics, with a data-processing installation for the graphic processing of the information to be represented and with an indicating unit for the visualization of the processed information, wherein the data-processing installation uses, among others, antialiasing procedures.

Objects which are synthetically generated and described symbolically by means of edges, contours and surfaces are represented as arrangements of discrete points on a matrix display, as a consequence of rastering the area of representation. Since the resolutive power achieved in, say, photography, has not as yet been possible in the field of generative graphics, there occur characteristic imaging faults (representational faults) which are subsumed in the designation aliasing effects or distortion. Typically these effects manifest themselves in the stepped appearance of lines and surface border which actually are smooth, between the structures in the original image and the raster grid of the screen. Other manifestations of aliasing include shifts and even complete losses of details, as well as changes in contours or, in animated images, the blinking of fine details.

There exist procedures for minimizing imaging faults and thus to enhance image quality. In general, these procedures are referred-to as antialiasing procedures or antialiasing algorithms.

In one procedure, the image is computed with a higher resolution than is subsequently displayed on the monitor. After computation, the image is reduced to the desired resolution by means of a digital filter; with this, the individual information-carrying pixels of the original image are summarized in weighted fashion. This reduces the aliasing effects, but is a very costly method, inasmuch as the number of computations involved increases in proportion to the square of the resolution of the matrix display. In this process the individual pixels are considered as discrete points in the mathematical sense.

In another procedure the image is pre-filtered, in an attempt to filter out the high frequencies. In this procedure one produces, as it were, an "artificial lack of sharpness," which smudges the aliasing effects, thus diminishing them. This approach is equivalent to treating the individual pixels as elementary surfaces.

In yet another procedure, designed to reduce faults in scan timing, one generates a greater number of images than is necessary for a given sequence of images, in order to subsequently filter them together in weighted fashion, at the timed output rate. This will smudge the contours of moving objects (motion blur).

One improvement designed to suppress aliasing effects consists of raising the number of pixels per unit of area. However, this is accompanied by higher costs, due to more expensive matrix displays and to the additional costs of storage and computing. Specifically in the case of instrumentation and multifunction displays in automotive vehicles, indicating [display] devices used for the representation of digitalized monochrome or color images are small and of low resolution.

Since the instrumentation and multifunction indicating devices in automotive vehicles are increasingly required to display graphics (such as navigational maps) in addition to the normal standard instruments such as digital indicators and pointer instruments, the low graphic resolution levels of the indicators resulted in pronounced aliasing effects. Today, the instrumentation of automotive vehicles generally involves small indicating devices with up to 400,000 pixels. As a function of pixel size, apparatus, geometry and configuration, this yielded pronounced aliasing effects. For instance, the low level of resolution made it impossible to represent inclined letters in a distortion-free or even legible manner. Strong aliasing effects were also noticeable in the case of streets or other graphic objects represented by short lines. This greatly impairs the quality of the image and the informational content is hard to read out.

Because of the costs of high-resolution displays, there is increasing use of antialiasing techniques in order to enhance the virtual resolution of monitors and displays. However, since this places considerable demand on computing capacity, one generally has to pay a corresponding price in image-processing time, unless one uses a graphic accelerator, capable of high-speed antialiasing algorithms via appropriate circuitry.

BRIEF SUMMARY OF THE INVENTION

It is the task of the present invention to offer an indicating device in which image quality is improved by the use of antialiasing procedures, while also fulfilling the requirements for high frame update rates, so as to produce as much as possible a non-jolting or smooth image.

According to the invention, this task is accomplished in that, when generating an image, the data-processing installation utilizes—in the graphic processing of at least two image areas or image objects of the image—different antialiasing procedures for these image areas or image objects; or else represents one image area or image object without an antialiasing procedure. By adopting such a procedure in the generation of an image, one can, for instance, represent objects that move relatively slowly over time with an antialiasing procedure which permits a higher image quality for such an image area or such an image object. On the other hand, fast-moving image objects, or image areas in which the objects move quickly, may be represented with an antialiasing procedure that is less computation-intensive—or else, without any antialiasing procedure at all. By adopting this compromise, an advantageous saving in computational capacity is achieved, so that in spite of improved image quality a high frame update rate is reached (or the number of newly computed images per second remains relatively high).

The same advantage is provided by a solution according to the invention in which—as a function of the available computing capacity of the data-processing installation, and/or of the frame repetition rate, and/or of the number of objects to be represented—different antialiasing procedures are utilized in the generation of images to be represented sequentially. In this solution, the data-processing installation determines in each case the time span required for the representation of the object to be represented, by various antialiasing procedures; it then determines whether the computing capacity and the time which results from the required frame repetition rate are sufficient to represent the image, using a given antialiasing procedure. If the time is not sufficient for representing the image produced via a specific antialiasing procedure, a less computation-intensive antialiasing procedure will have to be selected for the representation of that image. In this case one can store a table in the data-processing installation, in which table it can be read off directly whether or not a specific number of image objects can be represented or computed in a specific time span, with a specific antialiasing procedure.

Obviously the two solutions mentioned above can be combined; this results in a variety of possibilities of image processing or representation, allowing optimum utilization of the available hardware.

It is also advantageous in the generation of an image to keep on utilizing a computation-intensive antialiasing procedure for the representation of individual image areas and/or objects until the request for a new frame update is generated, after which the remaining image areas or objects to be represented are not represented at all, or are represented with a less computation-intensive antialiasing procedure. Particularly in indicating devices in vehicles it may occur that, because of a change in the situation, a rapid change in images may suddenly become necessary. In order to nonetheless represent in the display all the objects not as yet drawn, it is possible to obtain a gain in time by replacing the antialiasing procedure heretofore used for the momentary image construction by a less computation-intensive procedure or algorithm, thus speeding up the remaining image construction.

It also is advantageous if one can predetermine which antialiasing procedure is to be used by the data-processing installation for which image area. Naturally it is also possible to represent an image area or an image object without an antialiasing procedure. Thus one can represent on the matrix display an analog clock with pointers, using a computation-intensive antialiasing procedure. On the other hand, the navigational map—also represented on the same matrix display—is represented with a less computation-intensive antialiasing procedure, since, at high vehicle speed and frequent changes in direction, the objects on the map will generally move more rapidly than the pointers of the analog clock. For instance, using that procedure while the vehicle moves at lower speed, one could also represent the navigational map by means of a computation-intensive antialiasing procedure, inasmuch as the number of images per second to be newly computed at low speeds is smaller.

The following antialiasing procedures are imaginable. For one thing, if the computing capacity is very low or the graphics change very rapidly, it is possible to use no antialiasing procedure at all—i.e., lines and contours are represented solely by means of standard algorithms and are not further processed. The greater the available computing capacity and/or time, the more computation-intensive can be the antialiasing algorithm utilized.

This essential part of the invention may be called "scaled antialiasing." The individual steps are listed in order of increasing computing intensity in claim 8.

Below, the invention is explained in greater detail on the basis of figures.

DETAILED DESCRIPTION OF THE INVENTION

Figure 1:
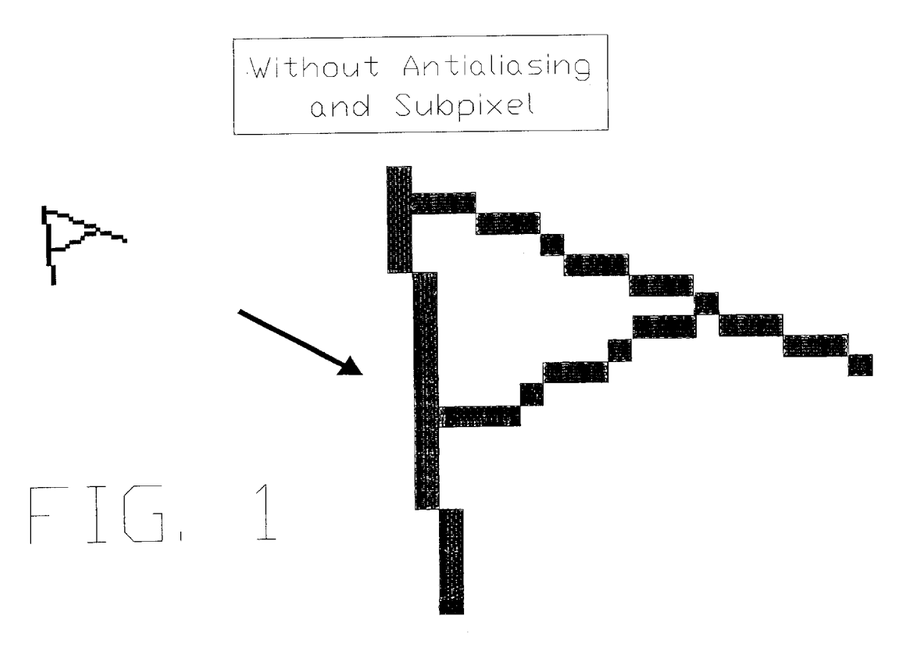
FIGS. 1 through 4: Representations of text and lines with and without antialiasing procedures.
Figure 2:
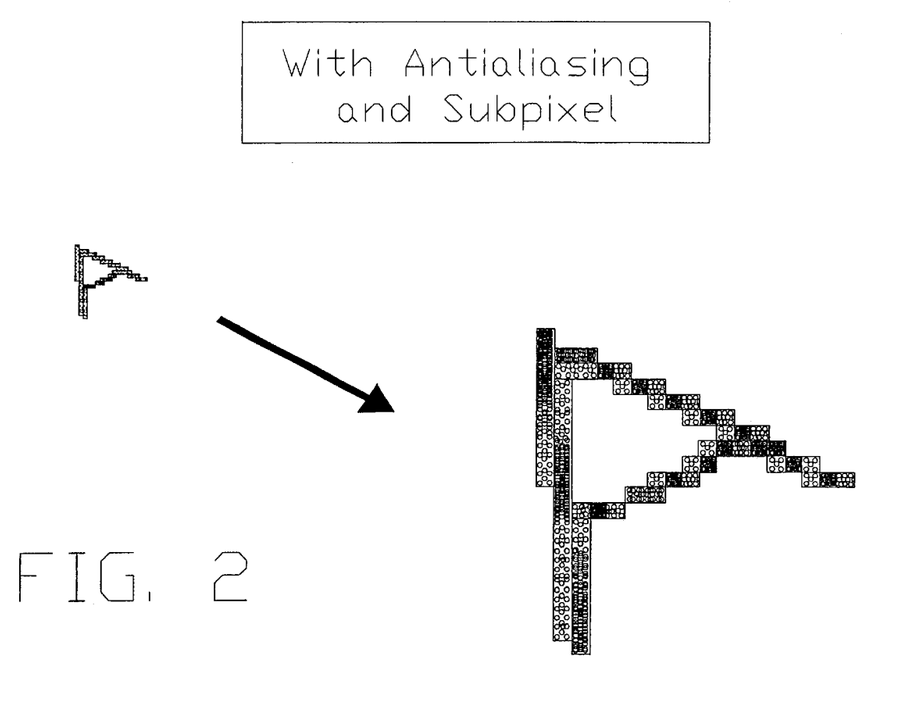
Figure 3:
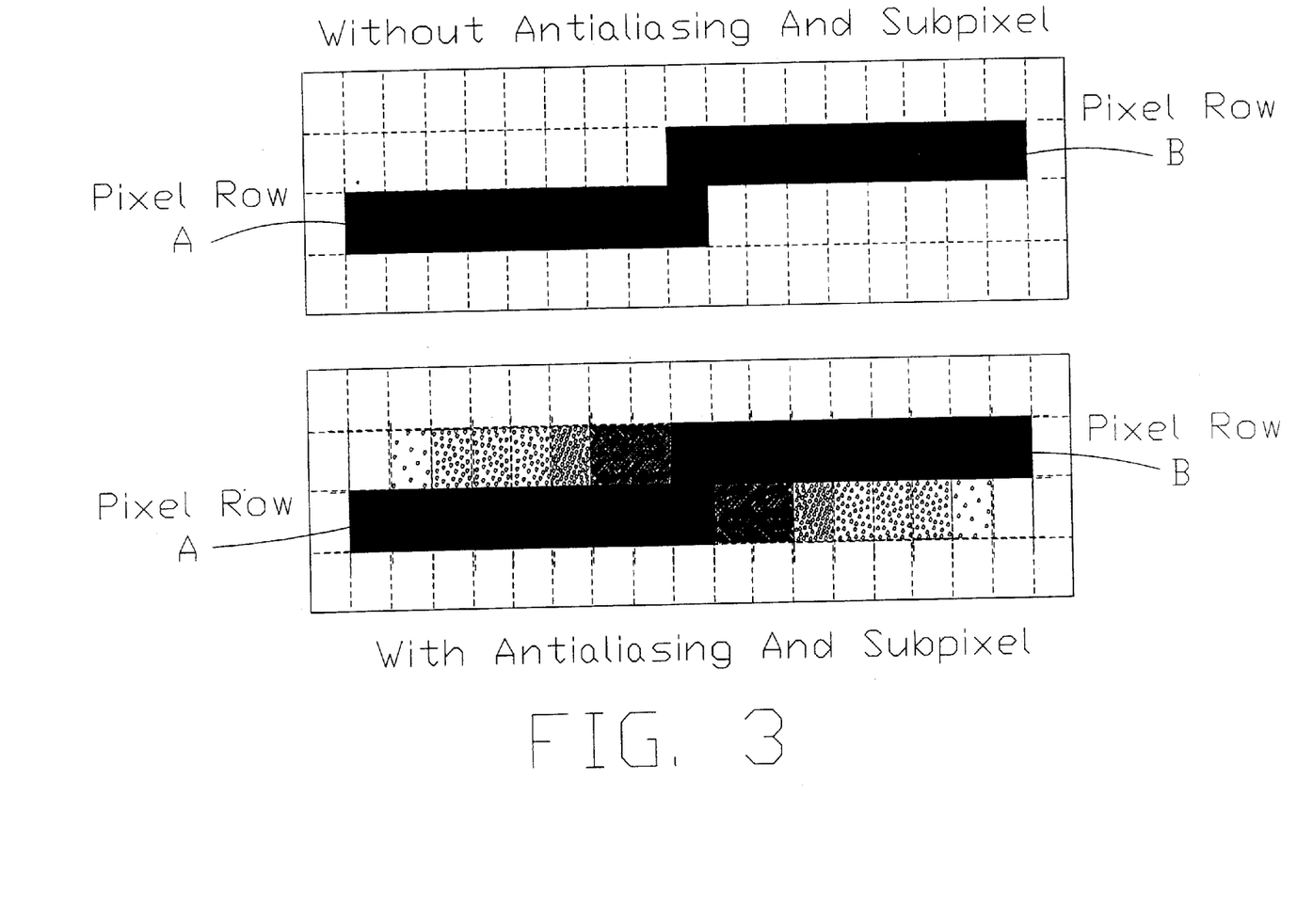
Figure 4:
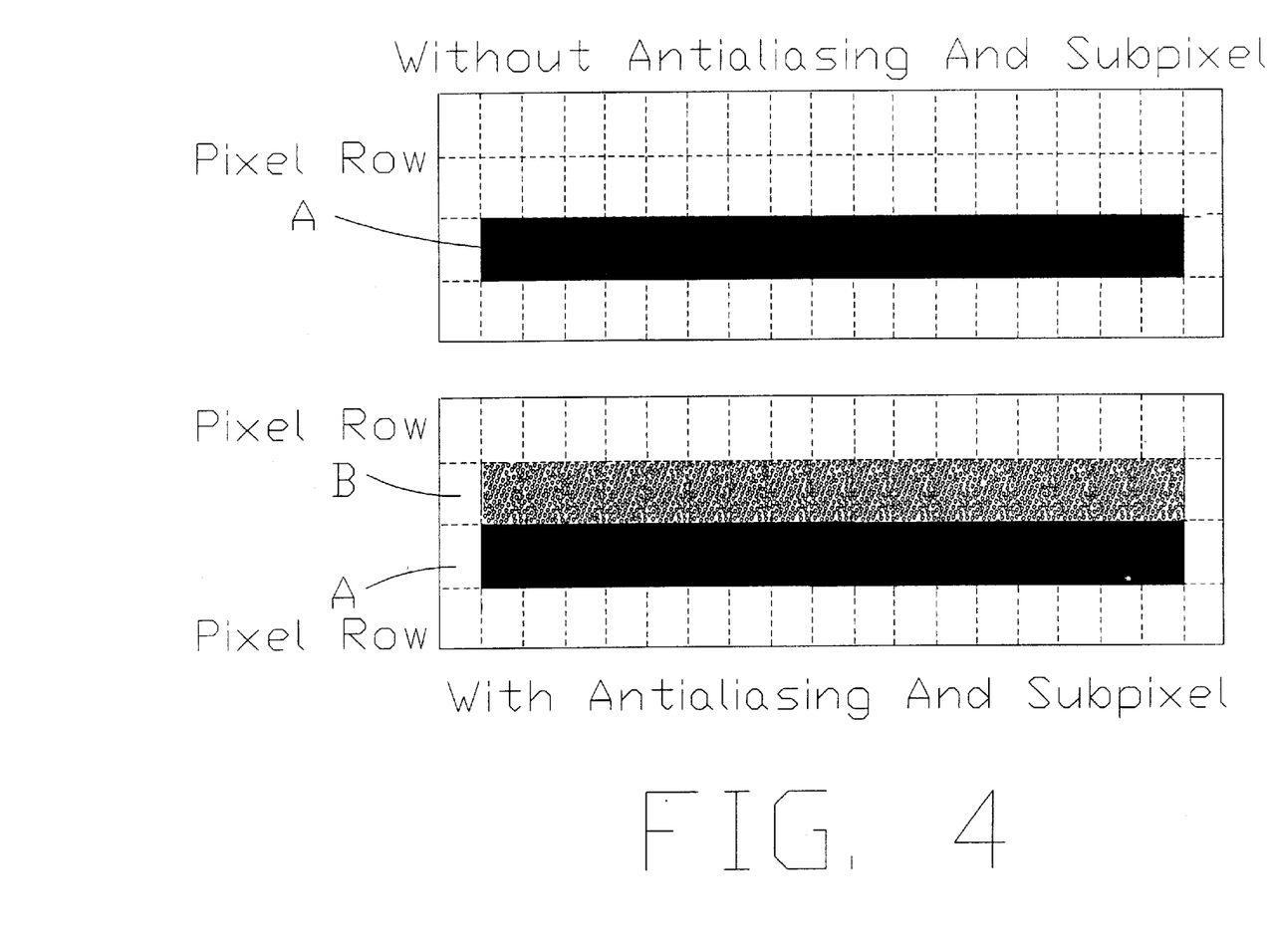

FIGS. 1 through 4 shows objects (text and lines) represented with and without antialiasing procedures. As can be seen in FIG. 1, a low level of resolution can lead to distortion and illegibility in small inclined letters. Pronounced aliasing effects can also be noticed in streets and other graphic objects represented by straight lines, as seen in FIGS. 3 and 4. This is caused by the fact that graphic objects such as, for instance, vectors, must be transformed by symbol algorithms into bitmap information and stored in the image storage. These algorithms quantize, taking into account the respective display resolution. Accompanying the ideal line, the pixels lying closest are activated (Bresenham algorithm). In drawing non-horizontal or vertical lines, the limited resolution of the display causes stepwise functions (aliasing). The shifting of straight lines produces a jolting motion, since shifting can only be accomplished by row or by column. This stepwise effect can be diminished by antialiasing procedures, for instance by determining the distance between the ideal line and the closest-lying pixel. This distance yields the resultant brightness (color mix in color displays) of the pixel.

As shown in FIG. 2, antialiasing greatly reduces the stepwise representation of the lines. This makes it possible to represent even relatively small letters in rotated form. In the enlargement of the letter "A" one recognizes that it was not represented by a single color tone.

FIG. 3 shows, enlarged in the upper picture, a step ladder, as produced without antialiasing. An antialiasing procedure was used in the lower picture of FIG. 3; the viewer can no longer see the step ladder.

FIG. 4 shows an example for the shifting of a horizontal line, using an antialiasing procedure with subpixels. By quantizing, taking into account the respective display-resolution, an upward shifting of the line can only be accomplished with jolts and jumps. The lower area of the image represents an antialiasing procedure in which the ideal line should be represented, say, 70% in pixel row A and 30% in pixel row B. With the antialiasing procedure, the distance from the nearest possible pixel is now determined and this distance is utilized for the resultant brightness (or for the color mix in the case of color displays) of the pixels in rows A and B.

Figure 5:
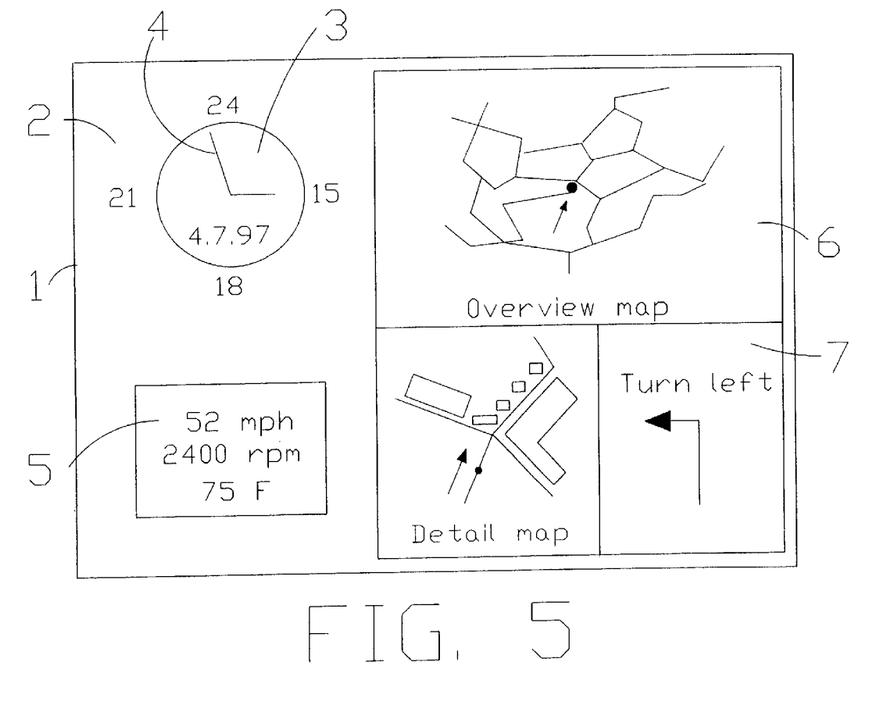
FIG. 5: an automotive combination instrument for indicating clock time as well as, among others, a navigational map.

FIG. 5 shows a combination instrument 1 with a matrix display 2 which simultaneously represents a clock 3 with pointers 4 as well as a navigational map 6, 7. The graphics represented on the navigational map 6, 7 will change relatively quickly (depending on the speed and the directional changes of the vehicle); consequently a relatively high frame updating rate is required, in order to permit a reproduction of the representation that will be as jolt-free as possible. On the other hand, the pointers 4 of clock 3 move considerably slower than the streets and building lines of navigational map 6, 7. Consequently, for viewing purposes, that clock 3 plus its pointers 4 must be represented by means of a computation-intensive antialiasing procedure; otherwise the viewer would clearly perceive the stepwise jumps of the graphic elements and would find them bothersome. On the other hand, depending on the frame updating rate, the graphics of the navigational map would be represented sometimes with a computation-intensive antialiasing procedure (if the image information changes relatively slowly) or else with less computation-intensive antialiasing procedures—or even without an antialiasing procedure—(if the image information changes rapidly).

What is claimed is:

1. An indicating device for the optical reproduction of graphics comprising:

a matrix display having at least two discrete image areas; and a data-processing installation for graphic processing of information to be represented on the display, wherein the data-processing installation is configured to use different antialiasing procedures for said at least two image areas for simultaneous display on the matrix display.

2. An indicating device according to claim 1, wherein as a function of available computing capacity of the data-processing installation, and/or of frame updating rate, and/or the number of objects to be represented, different antialiasing procedures are used in the generation of images to be represented in sequence.

3. An indicating device according to claim 1, wherein depending on available computing capacity of the data-processing installation, and/or on frame updating rate, and/or on the number of objects to be represented, different antialiasing procedures are used in the generation of images to be represented in sequence and wherein in the generation of an image, the data-processing installation uses in the graphic processing of at least two image areas different antialiasing procedures for said image areas.

4. An indicating device according to claim 1, wherein in the generation of an image, a computation-intensive antialiasing procedure is used for the representation of individual image areas until such time as a request for an image update is generated, whereupon remaining image areas to be represented are not represented at all, or are only represented with a less computation-intensive procedure.

5. An indicating device according to claim 1, wherein it can be predetermined for the data-processing installation or the latter determines by itself whether the computational capacity and the time available for the image processing by specific antialiasing procedures are sufficient; and the data-processing installation selects the antialiasing procedure for the image processing for which the time and the computational capacity are sufficient to provide complete image processing.

6. An indicating device according to claim 1, wherein it can be predetermined for the data-processing installation that it utilize a specific antialiasing procedure in the image processing of a specific image area.

7. An indicating device according to claim 1, wherein it can be predetermined that depending on available computational capacity and time, as determined by frame updating rate the data-processing installation utilize a specific, generally computation-intensive antialiasing procedure in the image processing of a specific image area.

8. An indicating device according to claim 1, wherein the device is used for a matrix display with low resolution, on which are represented simultaneously or consecutively graphics and/or texts moved at varying speeds.

9. A device for the generation of visual images comprising a data input; A processor responsive to said input and generating signals for creating a plurality of simultaneously displayable visual images, said processor including a first antialiasing program for use with one of said images and a second antialiasing program for use with a different one of said images.

10. A device according to claim 9 wherein said first and second antialiasing programs are operated as a function of available computing capacity of the processor.

11. A device according to claim 9 which further comprises a display responsive to said procesror for depicting a visual image representative information provided to the processor from said input.

12. A device according to claim 9 wherein the visual images depicted on said display at any particular time comprise a frame of information and wherein said frame of information is changed at a particular rate, said first and second antialiasing programs operating as a function of said frame change rate.

13. A device according to claim 12 wherein at a particular time said first and second antialiasing programs operate as a function of the number of images depicted at said particular time.

14. A method for graphic processing a plurality of images at a particular time comprising the step of using a first antialiasing procedure for one image and a different antialiasing procedure for another simultaneously displayable image.

15. A device comprising:
    a data processor having a predetermined computing capacity, the processor being capable of generating graphic images having a number of objects by applying scaled antialiasing; and
    a matrix display adapted to display the graphic images received from the data processor,
    wherein the data processor is configured to selectively apply antialiasing procedures as a function of one or more variables selected from the group consisting of: available computing capacity, frame repetition rate, the number of objects and an object change rate for each of the objects, and
    wherein the data processor further comprises a memory table containing a predetermined number of image objects that can be represented in a specific time span with a specific antialiasing procedure, and wherein the processor selects antialiasing procedures sufficient to represent the graphic images at the computing capacity and the frame repetition rate.

16. The device of claim 15, wherein the data processor applies a first antialiasing procedure for objects with an object change rate above a predetermined threshold value, and applies a second antialiasing procedure for other objects, and wherein the first antiallasing procedure is relatively more computation intensive than the second antialiasing procedure.

17. A device comprising:
    a data processor having a predetermined computing capacity, the data processor being capable of generating graphic images having a number of objects by applying scaled antialiasing; and
    a matrix display having 400,000 pixels or less, the display being adapted to display the graphic images received from the data processor,
        wherein the data processor is configured to selectively apply antialiasing procedures as a function of one or more variables selected from the group consisting of: available computing capacity, frame repetition rate, the number of objects and an object change rate for each of the objects, wherein the data processor applies a first antialiasing procedure for a first preselected set of objects, and applies a second antialiasing procedure for a second remaining set of objects, and wherein the first antialiaising procedure is relatively more computation intensive than the second antialiasing procedure, and wherein the first predetermined set of objects includes an analog clock and the second remaining set of objects includes an analog clock and the second remaining set of objects includes a navigational map.

18. An indicating device for displaying an image having a plurality of objects, the device comprising:

a data-processing installation adapted to receive information representing the objects and output a processed image, the data-processing installation being configured to apply to the information procedures selected from the group consisting of: (a) employing a standard algorithm without antialiasing, (b) employing an antialiasing algorithm with pixel-based starting and ending points, with constant background color, (c) employing an antialiasing algorithm with subpixel-based starting and ending points, with constant background color, (d) employing an antialiasing algorithm with pixel-based starting and ending points, with several background colors, (e) employing an antialiasing algorithm with subpixel-based starting and ending points, with several background colors, (f) employing an antialiasing algorithm with subpixel-based starting and ending points, with any desired number of background colors and (g) combination of the above-procedures; and a display associated with The data-processing installation that is adapted to receive and graphically represent the processed image;

wherein the data-processing installation selects the procedures to be applied to a given object according to the requirements for generating the image.

* * * * *

UNITED STATES PATENT AND TRADEMARK OFFICE
CERTIFICATE OF CORRECTION

PATENT NO.    : 6,597,365 B1
DATED         : July 22, 2003
INVENTOR(S)   : Thomas Baecke and Peter Hartmann It is certified that error appears in the above-identified patent and that said Letters Patent is hereby corrected as shown below:

<u>Title page,</u>
Item [57], ABSTRACT,
Line 5, delete "[, among others,]".

<u>Column 1,</u>
Line 63, after "vehicles, indicating" delete "[display]".

<u>Column 5,</u>
Line 53, the words "A processor," should be replaced with -- a processor --.
Line 53, after the word "said" insert -- input for processing information --.
Line 63, the word "procesror" should be replaced with -- processor --.

<u>Column 6,</u>
Line 9, insert the word -- of -- after the words "graphic processing".
Line 41, the word "antiallasing" should be replaced with -- antialiasing --.
Line 61, the word "antialiaising" should be replaced with -- antialiasing --.
Line 65, the phrase "an analog clock and the second remaining set of objects includes" should be deleted.

<u>Column 8,</u>
Line 6, the word "combination" should be replaced with -- combinations --.
Line 7, the word "The" should be replaced with -- the --.

Signed and Sealed this

Thirtieth Day of December, 2003

JAMES E. ROGAN
*Director of the United States Patent and Trademark Office*